United States Patent [19]

Golan et al.

[11] 4,278,155

[45] Jul. 14, 1981

[54] DRAW WORKS TRANSMISSION CONTROL

[75] Inventors: Kenneth F. Golan, Pekin; James E. Winzeler, East Peoria, both of Ill.

[73] Assignee: Caterpillar Tractor Co., Peoria, Ill.

[21] Appl. No.: 89,113

[22] PCT Filed: May 2, 1979

[86] PCT No: PCT/US79/00293

§ 102 (e) Date: May 2, 1979

§ 371 Date: May 2, 1979

[87] PCT Pub. No: WO80/02446

PCT Pub. Date: Nov. 13, 1979

[51] Int. Cl.[3] .......................... B60K 41/24; F15B 1/02

[52] U.S. Cl. .................................. 192/4 R; 192/12 C; 138/31; 60/413; 137/596.13

[58] Field of Search .................... 192/4 R, 4 A, 12 C, 192/17 A, 109 F; 254/187.5, 160; 138/31; 60/413; 137/596.13, 102

[56] References Cited

U.S. PATENT DOCUMENTS 3,128,861 4/1964 Trondsen .......................... 192/17 A
3,985,063 10/1976 Lemon ............................ 192/109 F
3,991,787 11/1976 Schmitt .......................... 137/596.13
4,048,799 9/1977 Golan .................................... 60/413

*Primary Examiner*—George H. Krizmanich

*Attorney, Agent, or Firm*—Wegner, Stellman, McCord, Wiles & Wood

[57] ABSTRACT

In a control (28) for a hydraulically operated draw works or the like having a hydraulically disengaged brake (14), a transmission (10, 12) and a brake control valve (114, 122), the improvement including an accumulator (174) having a check valve (196) connected between the brake control valve outlet (152) and the brake (14) to modulate the application of the brake (14) after the brake (14) has been fully released and to provide no modulation of brake (14) application after the brake (14) has been only partially released to thereby minimize shock in the draw works components when a load is lowered rapidly and yet provide rapid action when operated slowly.

9 Claims, 4 Drawing Figures

DRAW WORKS TRANSMISSION CONTROL

DESCRIPTION

1. Technical Field

This invention relates to controls for hydraulically operated winches, and more specifically, hydromechanical boom or hook type layer draw works transmission controls.

2. Background Art

Prior art of possible relevance includes U.S. Pat. No. 4,048,799, issued Sept. 20, 1977 to Golan et al., and assigned to the assignee of the present invention.

Winches, or as more generally known, draw works, are used in a large variety of operations and, as a consequence, there are draw works constructions available with widely varying degrees of sophisticated control and drive equipment. Some of the more sophisticated draw works constructions are hydraulically operated and include a hydraulic motor for driving a draw works drum. Typically, there is provided a hydraulically disengaged brake which brakes the drum to prevent unduly rapid lowering of a load to be hoisted and also multiple-speed, hydraulically controlled transmissions interconnect the drum and the drive motor therefor.

There is also provided means for regulating the amount of control fluid applied to the hydraulically disengaged brake to control the degree of disengagement of such brake and thereby control the rate of descent of an elevated load.

In the usual case, two types of load-lowering are desirable. The first is the so-called "drop and catch" lowering wherein the brake is fully disengaged and the load is allowed to fall at a maximum rate. When the load has been lowered the desired amount, the brake is once again engaged and further lowering is arrested. The second type of lowering is the so-called "controlled" lowering in which the brake is only partially disengaged, thereby allowing a load to be lowered at some controlled rate less than the maximum speed.

During drop and catch lowering, initial engagement of the brake to catch the load will cause "grabbing" of the brake rather than smooth engagement. This, in turn, communicates a considerable shock to the internal components of the brake and draw works components connected to the output of the brake. This shock reduces the useful life of such components by causing premature wear and failure thereof.

It is therefore highly desirable to prevent such shock loading by providing for gradual application of the brake when arrest of drop and catch lowering is desired.

During controlled lowering, however, such a feature is not desirable since modulation of brake application will result in additional travel of the load after the operator applies the brake thereby making fine control of load position difficult. Moreover, such modulation is not necessary since changes in torque levels are not so drastic as to cause the detrimental shock noted above.

DISCLOSURE OF THE INVENTION

In one aspect of the present invention, there is provided in a control for a hydraulically operated draw works or the like having a hydraulically disengaged brake, a transmission, and a brake control valve, the improvement including an accumulator connected between the brake control valve and the brake to modulate the application of the brake after the brake has been fully released and to provide no modulation of the brake after it has been only partially released to thereby minimize shock in the draw work components when a load is lowered rapidly and yet provide rapid action when operated slowly.

BEST MODE FOR CARRYING OUT THE INVENTION

Figures 1, 3:
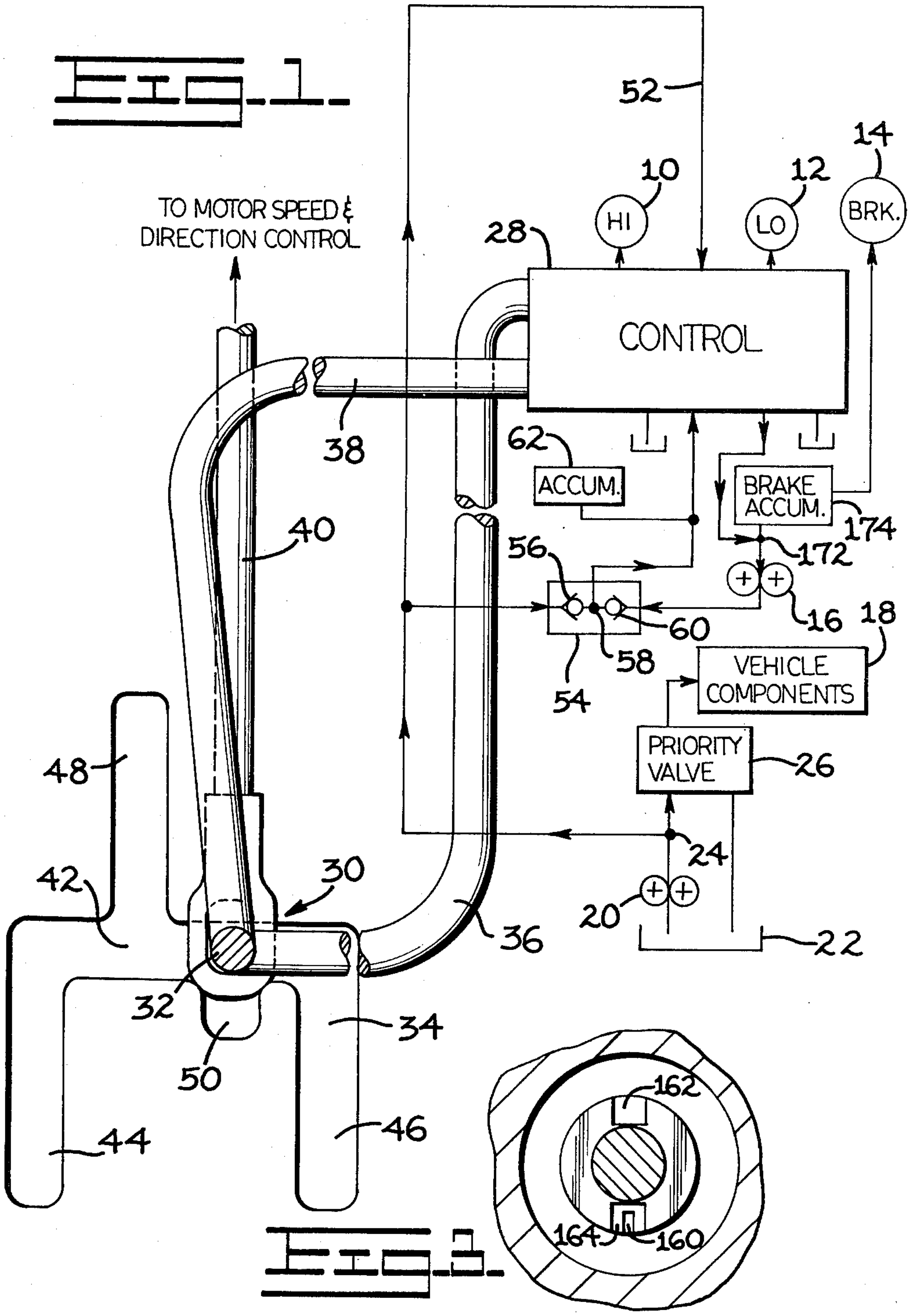
FIG. 1 is a schematic of a hydraulic control system made according to one embodiment of the invention and illustrating mechanical details of manual actuators therefor.
FIG. 3 is a sectional view taken approximately along the line 3—3 of FIG. 2.

An exemplary embodiment of a control system for a hydraulically operated draw works or the like including a hydraulically disengaged brake, a multispeed, hydraulically controlled transmission and a drum to be driven or braked is illustrated in the drawings and with reference to FIG. 1, is seen to include a multi-speed, hydraulically controlled transmission including a high speed section shown schematically at 10 and a low speed section schematically illustrated at 12. As will be seen, the transmission including the components 10 and 12 will be of the type that when fluid under pressure is directed to the high speed section 10, the output speed of the transmission will be in high gear, and when fluid under pressure is directed to the low speed section 12, the output speed of the transmission will be in the low range.

The usual draw works assemblage will include a spring-engaged, hydraulically disengaged brake which may be of a conventional construction and which is illustrated schematically at 14. The system will also include a metering pump 16 which will be suitably coupled to the draw works drum (not shown) through a one-way clutch (not shown) so as to be driven thereby when the load is lowered at a speed proportional to the rate of rotation of the draw works drum. The purpose of the metering pump 16 is to act as a governor and limit the rotational velocity of the drum.

When the draw works system is used in a vehicle as, for example, a pipe layer, there will be a number of additional hydraulically controlled components associated with the vehicle, which components are schematically illustrated at 18 and may include steering clutches, power transmission and vehicle brake elements. Fluid under pressure is provided to the system by a hydraulic pump 20, typically driven by the prime mover of the vehicle. The pump 20 receives oil from a reservoir 22 and directs the same, under pressure, to a junction 24. One side of the junction 24 extends to a priority valve 26 which, in turn, permits the flow of fluid to the vehicle components 18. The other side of the junction 24 extends to the control system of the present invention.

The priority valve 26 is of conventional construction and is operative to ensure delivery of fluid to the control system of the present invention at a pressure equal to or exceeding a predetermined minimum pressure.

Frequently, hydraulic fluid flow requirements of the vehicle components 18 will cause the pressure to drop to a relatively low value which is insufficient to maintain engagement of the components of the transmission. The priority valve 26 prevents such from occurring.

The control system of the present invention includes a control valve, generally designated 28, which comprises two valves in a common housing. Manual actuators, generally designated 30, are provided for the valve 28 in, for example, an operator area. The manual actuators 30 include, for example, a handle 32 which may be grasped by the operator to perform a variety of functions to be described. A console within the operator area is provided with a slot 34 in which the handle 32 may be moved.

A first mechanical link, shown schematically at 36, is attached to the handle 32 and extends to the control valve 28 to convey thereto mechanical motion of the handle 32 directing the selection of a particular transmission output speed. A similar linkage, shown schematically at 38, extends to a brake control section of the valve 28 to convey mechanically movement of the handle 32 to the valve 28 to direct the flow of hydraulic fluid under pressure to the brake 14 to control its degree of disengagement.

A third linkage, shown schematically at 40, extends to a motor speed and direction control system (not shown) which is operative to control the speed of the hydraulic drive motor for the draw works as well as its directional output.

The linkages 36, 38 and 40 may be conventional in nature and, for example, in the form of control cables or linkages. It is only necessary that the linkage 36 be responsive to movement of the handle 32 in the right-left direction, as viewed in FIG. 1, and nonresponsive to other directions of movement thereof. The linkages 38 and 40 are similar, but are responsive only to up-down movements of the handle 32, as viewed in FIG. 1, and nonresponsive to left-right movement.

The slot 34 defines a shift pattern for the handle 32. It includes a horizontally elongated slot 42. When, as viewed in FIG. 1, the handle 32 is disposed in the left-hand end of the slot 42, the control valve 28 will direct the transmission to select its high speed output. When the handle 32 is in the right-hand extremity of the slot 42, it will direct the control valve 28 to select the low speed range of the transmission.

At each end of the slot 42, there are provided downwardly extending slots 44 and 46. When the handle 32 is aligned with either of the slots 44 and 46, and depressed therein, the linkage 40 will direct the motor speed and direction control system to drive the drum of the draw works to elevate the load. The degree of depression of the handle 32 in either of the slots 44 and 46 will control the speed of the drive motor for the winch.

Also included is an upwardly extending slot 48 intermediate the ends of the slot 42. When the handle 32 is aligned with the slot 48, a direction by the valve 28 to the transmission will cause the latter to assume a neutral condition. As the handle 32 is elevated in the slot 48, the brake 14 will be allowed to progressively disengage and increase in speed as the handle 32 moves further up the slot. At the same time the linkage 40 may be directed after the backlash has been taken up to drive the drum motor in a direction to lower the load at a particular speed, but only if the load is not of sufficient magnitude for gravity to overcome the friction of the draw works assemblage.

A short, downwardly extending slot 50 intersects the slot 42 intermediate its ends. When the handle 32 is directed downwardly into the slot 50, there will be a direction to the motor speed and direction control system to energize the drive motor for the draw works.

Whenever the handle 32 is aligned with either of the slots 48 or 50 or in between the two, the transmission will be directed, by the valve 28, to remain in neutral. Thus, the use of the slot 50 enables the energization of the drive motor for the winch while the transmission is in neutral to enable warmup of the components without changing the position of the load carried by the draw works. This feature of the invention, when used, ensures excellent response of the system in cold environments.

Returning to the junction 24, hydraulic fluid under pressure is directed along a line 52 to the transmission control side of the valve 28 in a manner to be described in greater detail hereinafter. It is also directed to a check valve system 54. The check valve system 54 includes a first check valve 56 which precludes backflow from any downstream component to the junction 24. Just downstream of the check valve 56 there is located a junction 58. Connected to the junction 58 is a check valve 60 which extends to the metering pump 16. The check valve 60 precludes discharge of an accumulator 62 except through the valve 28.

Figure 2:
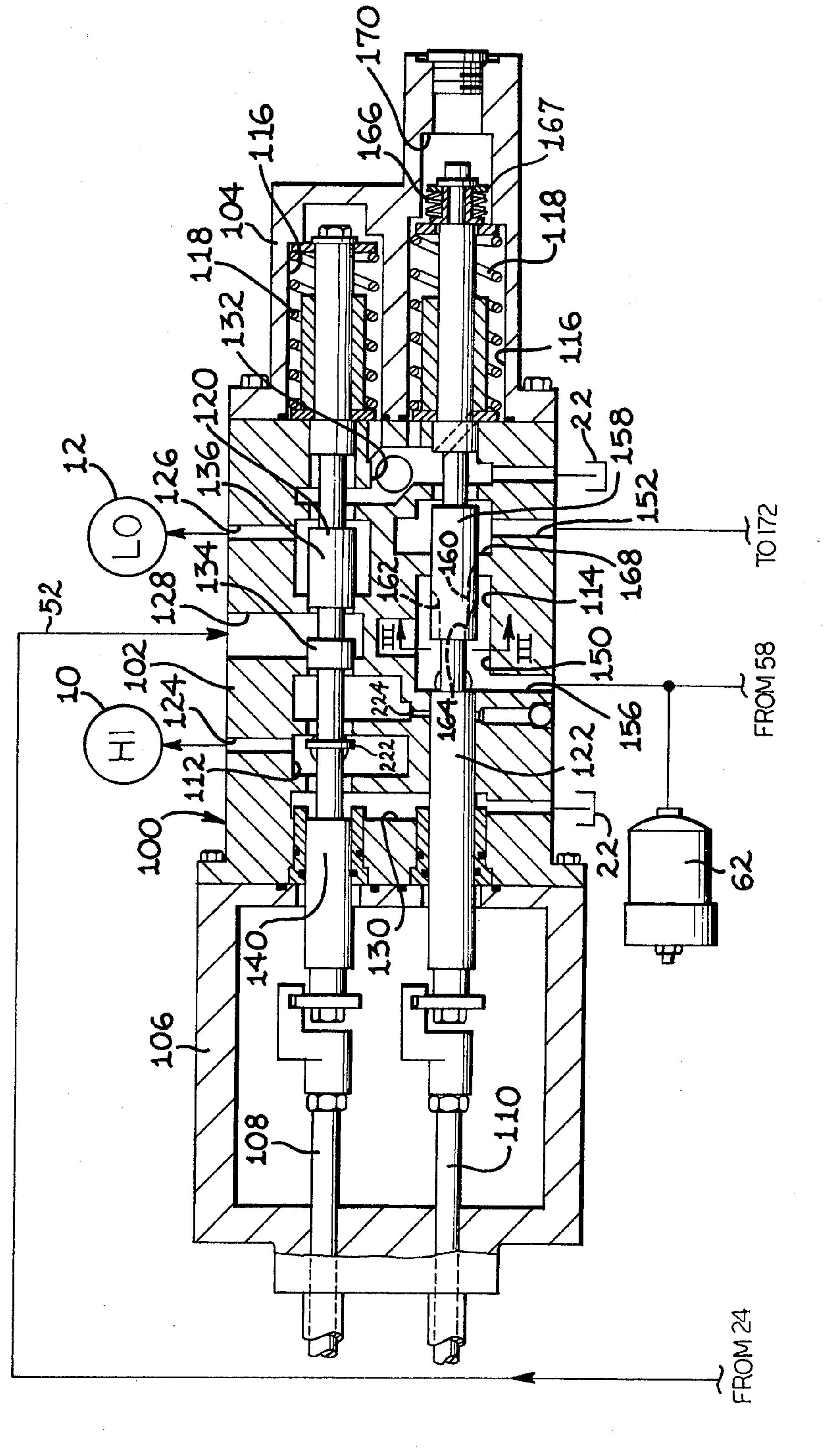
FIG. 2 is a sectional view of a control valve embodied in the invention which also schematically illustrates peripheral components utilized in the system.

Turning now to FIGS. 2 and 3, the construction of the control valve 28 will be described in greater detail. The valve 28 includes a housing 100 formed of a center housing 102, a right end housing 104 and a left end housing 106. The left end housing 106 receives, in a conventional fashion, cable ends 108 and 110 of the linkages 36 and 38, respectively. The center housing 100 includes a transmission control bore 112 and a brake control bore 114. The housing 104 includes cavities 116 which are aligned with the bores 112 and 114 and house bi-directional spring centering assemblies 118 which are operative to center respective ones of a transmission control spool 120 in the bore 112 and a brake control spool 122 in the bore 114 to the positions illustrated in FIG. 2 regardless of whether the spools 120 and 122 are shifted to the right or to the left.

The spools 120 and 122 have leftward extensions which extend into the housing 106 for connection to the cable ends 108 and 110 whereby the spools 120 and 122 may be shifted to the right or to the left in their bores by manipulation of the handle 32, as mentioned previously.

The transmission control bore 112 includes a first outlet port 124 which may be connected to the high section 10 of the transmission to be controlled and a second outlet port 126 which may be connected to the low section 12 of the transmission. Intermediate the outlet ports 124 and 126 is an inlet port 128 which is connected to the junction 24 (FIG. 1). On the sides of the outlet ports 124 and 126 opposite from the inlet port 128, the bore 112 is provided with drain ports 130 and 132, respectively, which drain ports are also common to the brake control bore 114 and which are connected to the reservoir 22.

The spool 120 includes spaced lands 134 and 136. Dependent upon the position of the spool 120 within the bore 112, the land 134 will either preclude fluid communication between the ports 124 and 128 or the ports 124 and 130. The land 136 will either preclude fluid communication between the ports 126 and 128 or the ports 126 and 132. In the position of the valve illustrated in FIG. 2, which corresponds to a position directing the transmission to be in neutral, the land 134 and 136 block the flow of pressurized fluid into either of the transmission sections 10 and 12, while at the same time allow fluid flow from those sections to the reservoir 22 through the drain ports 130 and 132 respectively.

To command the transmission to operate in its low range, the handle 32 is moved to the right in the slot 42, as mentioned previously. This will cause a commensurate shift of the spool 120 to the right within the bore 112. This, in turn, will establish fluid communication between the inlet 128 and the outlet 126. Flow to drain through the port 132 is blocked by the right-hand side of the land 136 in such a case, while flow to drain through the port 130 continues because the land 140 does not move far enough to block communication between the outlet port 124 and the drain port 130. Flow from the inlet 128 to the outlet 124 continues to be blocked but now by land 222 instead of land 134.

Conversely, when the handle 32 is shifted to the left, as viewed in FIG. 1, to direct the transmission to operate in its high range, the spool 120 will shift to the left within the bore 112 from the position shown. At this time, the land 134 will shift to the left to preclude fluid communication between the port 124 and the drain port 130 while enabling fluid flow from the inlet port 128 to the port 124. The rather long axial length of the land 136 will continue to block the flow of fluid to the outlet port 126.

Figure 4:
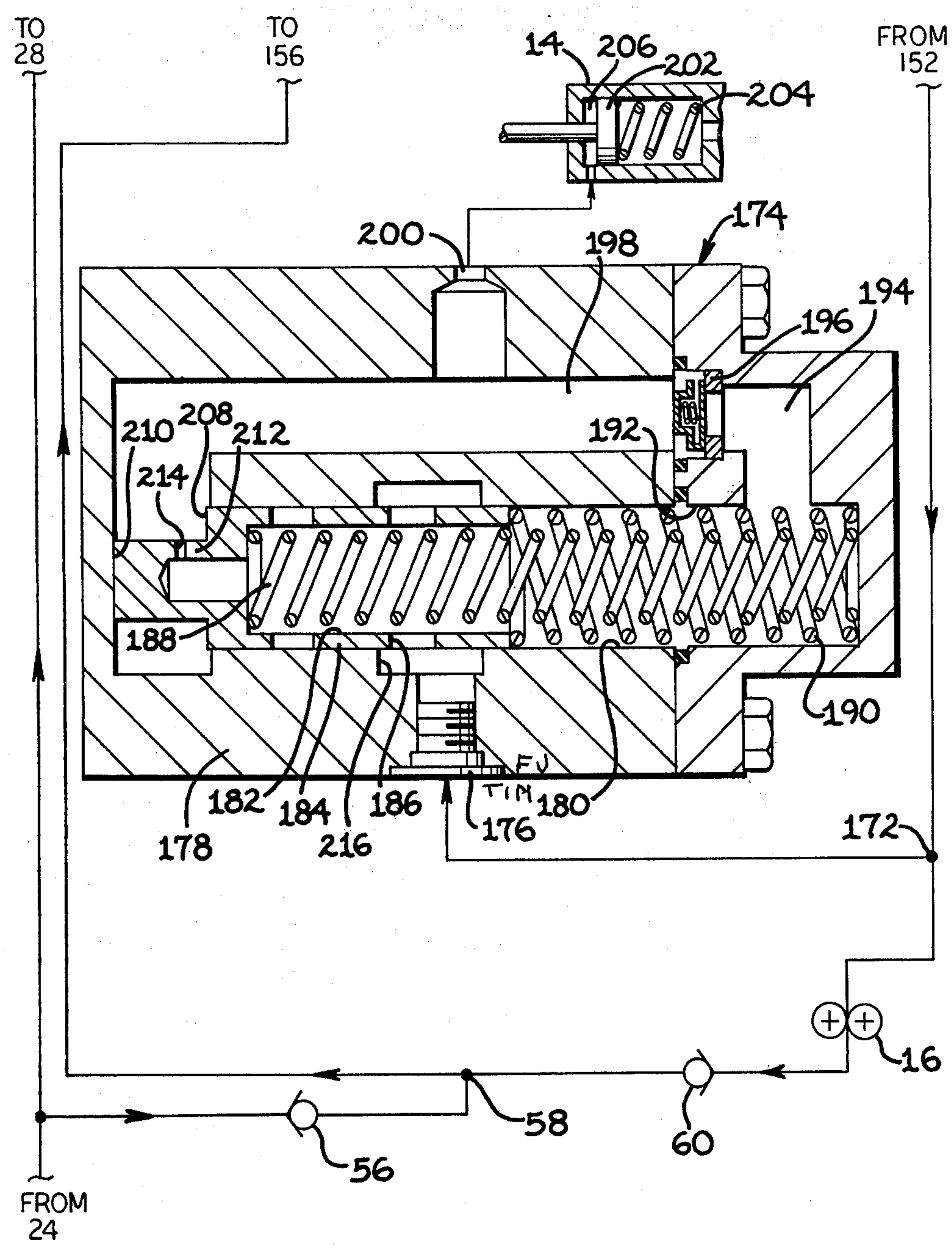
FIG. 4 is a sectional view of the accumulator made according to one embodiment of the present invention which also schematically illustrates peripheral components.

Turning now to the brake control section of the valve 28, the brake control bore 114 includes a cavity 150 which is connected to junction 58 for receipt of fluid under pressure. Just to the right of the cavity 150 as seen in FIG. 2, is an outlet port 152 which is adapted to be connected to both a brake accumulator 154 and to the metering pump 16, as shown in FIG. 4. The outlet port 152 is disposed between the cavity 150 and the outlet port 132 which extends to the reservoir 22.

The spool 122 includes a land 158 having a relatively long axial length which is normally operative to preclude the flow of fluid from the cavity 150 to the outlet port 152 while allowing flow of fluid from the outlet port 152 to drain through the drain port 132 or to interrupt fluid communication between the drain port 132 and the outlet port 152 and allow fluid to flow from the cavity 150 to the outlet port 152 under circumstances to be described in greater detail hereinafter.

As seen in FIGS. 2 and 3, the land 158 includes oppositely disposed, axially extending grooves 160, 162 and 164 in its periphery. Each of the grooves 160, 162 and 164 opens to the inlet side of the land 158 and, as can be best seen in FIG. 2, the groove 160 has a relatively long axial length, the groove 162 has an intermediate axial length, while the groove 164 has a relatively short axial length. As seen in FIG. 3, the grooves 162 and 164 have relatively large cross sections, while the groove 160 has a relatively small cross section. Moreover, all three grooves have a progressively decreasing cross section from left to right.

In the case of a brake in a draw works, it is desired that there be an infinite number of degrees of disengagement so that the speed of descent of the load can be regulated. The grooves 160, 162 and 164 serve as metering grooves to assist in attaining such a degree of brake disengagement control. Specifically, the further the spool 122 is moved to the right, as viewed in FIG. 2, the greater the fluid flow from the cavity 150 to the outlet 152 through the groove 160. The greater the fluid flow, the greater the degree of disengagement of the brake 14 which, it will be recalled, is of the hydraulically disengaged type. For greater rightward shifts of the spool 122 within the bore 114, fluid communication between the cavity 150 and the port 152 will be established through the larger groove 162 so that fluid flow will be less restricted. For even greater rightward shifts of the spool 122, fluid communication between the cavity 150 and port 152 will be established through all three grooves 160, 162 and 164. Fluid flow will then be at its maximum allowing the load to be lowered at its maximum rate.

To enable the operator to feel when the condition of maximum lowering rate is being approached, a spring 166 has been included to provide positive feedback to the operator. As the leading edge of the groove 164 approaches the leftmost surface of cavity 168 which leads to port 152, the washer 167 contacts a shoulder 170 of the bore 114. Any further rightward movement of spool 122 compresses the spring 166 and provides for a positive operator feel when the maximum speed groove 164 has been entered.

As best seen in FIGS. 1 and 4, fluid flowing from the port 152 will flow to a junction 172 and simultaneously to the metering pump 16 and a brake accumulator, generally shown at 174.

As explained above, the brake is of the spring engaged-hydraulically disengaged type and therefore the brake 14 may be disengaged, and the load lowered, only by supplying brake 14 with hydraulic fluid from the port 152. In such a brake, the greater the fluid pressure the greater the degree of disengagement and the greater the quantity of fluid required to cause progressive disengagement. As shown in FIGS. 1 and 4, the brake 14 can only be supplied with hydraulic fluid through the brake accumulator 174.

Hydraulic fluid metered through the grooves 160, 162 and 164 is supplied to a brake accumulator port 176 in a housing 178 of the accumulator 172. Located within the housing 178 is a bore 180 which contains a piston 182. The piston 182 has a relatively thin wall 184 which is perforated by a number of passageways 186. As viewed in FIG. 4, the piston is urged to the left by springs 188 and 190.

When fluid is supplied to the port 176, it will flow through the piston passageways 186 and into a spring pocket 192. The spring pocket 192 is ultimately connected to the brake 14 by a passageway 194, a check valve 196, an accumulator chamber 198 and an accumulator port 200.

Located within the brake 14 is a brake release piston 202, a brake return spring 204 and a brake cylinder 206. The brake 14 is otherwise conventional in construction and need not be further explained. It is sufficient to note that when the piston 202 is in the leftmost position, as viewed in FIG. 4, the brake 14 will be fully applied and as the piston 202 is forced an increasing distance to the right by pressurized fluid in the cylinder 206, the brake 14 will be increasingly released.

The piston return spring 204 creates a force opposing fluid pressure in the cylinder 206. Therefore, if fluid pressure in chamber 206 is insufficient to overcome the force created by the springs 204, the piston 202 will be urged to the left and the brake 14 will be applied.

As stated above, the pressure of the hydraulic fluid supplied from the outlet port 152 to the accumulator port 176, and consequently the brake 14, may be varied by operator actuation of the brake spool 122. Depending on the pressure of fluid supplied to the brake 14, brake release will be accomplished by one of two methods. If fluid supply pressure is high, the force on the piston 202 will be sufficient to completely overcome the force created by the spring 204. In this case, the brake piston 202 will be forced fully to the right and the brake 14 will be completely released. As a consequence of this large piston 202 movement, a large volume of hydraulic fluid will enter the brake cylinder 206.

A relatively low hydraulic fluid pressure will be insufficient to completely overcome the force created by the return spring 204 and the brake piston 202 will be forced only a short distance to the right. The piston movement will be insufficient to completely release the brake 14 but will cause slippage. In this situation, the volume of fluid entering the piston cylinder 206 will be relatively small.

As will be seen in FIG. 2, when the brake spool 122 is returned to the neutral position, the outlet port 152 will be connected to the relief port 132 and consequently to the tank 22. This will cause the pressure of the fluid supplied to the accumulator port 176, and consequently the spring chamber 192, to drop to a very low level. The pressurized fluid remaining in the accumulator chamber 198 and the brake cylinder 206 will then cause the check valve 196 to seat, precluding reverse fluid flow through the spring chamber 192. All fluid from the brake 14 will thus be forced through the chamber 198 and towards the left end of the piston 182.

Located on the piston 182 are piston surfaces 208 and 210 upon which the fluid located in the accumulator chamber 198 will act. Located within a piston wall 212 is a metering orifice 214 which establishes fluid communication between the accumulator chamber 198 and the accumulator port 176 through the piston passageways 186.

When the pressure of fluid supplied to the brake 14 is relieved, reverse flow to the tank 22 through the ports 152 and 132 will be accomplished by one of two modes depending upon the volume of fluid contained in the piston cylinder 206.

If the pressure, and therefore the volume, of fluid located in the brake cylinder 206 is low, as is the situation during controlled lowering when the brake 14 is only partially released, there will be insufficient fluid in the accumulator chamber 198 and brake cylinder 206 to fully compress the springs 188 and 190. Therefore, while the accumulator piston 182 will travel a slight distance to the right, this travel will not compress the springs 188 and 190 far enough to create a fluid backpressure within the accumulator chamber 198 and brake cylinder 206 sufficient to cause slippage of the brake 14. Any fluid located in the accumulator chamber 198 and the brake cylinder 206 will simply flow through the metering orifice 214 as the piston 182 slowly moves to the left and will be utlimately returned to the tank 22 through the control 28.

If the pressure, and therefore the volume, of fluid supplied to and entering the brake 14 is large, as when the brake 14 is fully released, reverse flow to the control 28 will be somewhat different. In this situation, fluid pressure in the accumulator chamber 198 and the brake cylinder 206 will be sufficient, when acting on the accumulator piston surfaces 208 and 210, to fully compress the springs 188 and 190. As the piston surface 208 moves beyond a port edge 216, the accumulator piston 182 will act as a relief valve and allow a large volume of fluid to flow to the accumulator port 176. As the residual pressure in the brake 14 and the accumulator chamber 198 decreases, the springs 188 and 190 will once again force the piston 182 to the left. The springs 188 and 190 are chosen such that the force on the piston 182 will cause a backpressure in the accumulator chamber 198 and the brake cylinder 206 sufficient to maintain slippage in the brake 14.

Once the piston 182 has been urged a short distance to the left, the accumulator chamber 198 will no longer be in direct fluid communication with the port 176 and any remaining fluid in the accumulator chamber 198 and the brake cylinder 206 must flow through the metering orifice 214 and the piston passageways 186. The metering orifice 214 will limit the flow of fluid from the piston cylinder 206 and thus cause gradual application of the brake 14.

INDUSTRIAL APPLICABILITY

In operation, there will be two distinct modes of load lowering available to the operator. The first is "drop and catch" lowering where it is desired to lower the load for a distance at the maximum rate available and then arrest lowering at a particular point. The second mode is "controlled" lowering where it is desired to lower a load at a speed somewhat less than the maximum available. As described above, when lowering at the maximum rate is desired, the brake spool 122 will be in the rightmost position as viewed in FIG. 2. High pressure fluid will be allowed to flow through the grooves 160, 162 and 164 from the cavity 150 to the outlet port 152. As shown in FIG. 4, fluid flow from the outlet port 152 will proceed to the junction 172 and then to the accumulator port 176 and the metering pump 16. Upon reaching the accumulator port 176, the fluid flows through the piston passages 186, the spring pocket 192, the passageway 194, the check valve 196 and finally through the accumulator port 200 to the brake cylinder 206. The accumulator chamber 198 will become completely filled during this process.

Since fluid pressure and flow is at its maximum, the brake piston 202 will be forced completely to the right and the brake 14 will be fully released. The load will therefore drop at its maximum rate.

When it is desired to stop descent of the load, the brake spool 122 is shifted to the neutral position as shown in FIG. 2. As indicated above, the outlet port 152 will then be in fluid communication with the drain port 132, and consequently, the tank 22. The accumulator spring pocket 192 and the passageway 194 will thus be drained by the drain port 132. Fluid pressure in the accumulator chamber 198 and the piston cylinder 206 will then cause the check valve 196 to be completely seated.

Since the check valve 196 is closed, all hydraulic fluid to be discharged from the brake 14 must move the accumulator piston 182 against the springs 188 and 190. Since the fluid pressure in the accumulator chamber 198 and the piston cylinder 206 is high, the fluid acting upon the piston surfaces 208 and 210 will create a force sufficient to fully compress the springs 188 and 190.

As the piston 182 moves to the right, the piston surface 208 will clear the edge 216 of the port 176 and the piston 182 will act as a relief valve. As the pressure of fluid in the accumulator chamber 198 and the piston cylinder 206 decreases, the springs 188 and 190 will force the piston 182 to once again move towards the left, closing off accumulator port 176.

Since the springs 188 and 190 are greatly compressed, they will cause the piston 182 to act upon fluid contained in the accumulator chamber 198 with a force sufficient to cause a fluid backpressure in the accumulator chamber 198 and the piston cylinder 206 such that the brake 14 will continue to slip.

With the accumulator chamber 198 no longer in direct fluid communication with accumulator port 176, any further fluid flow from the accumulator chamber 198 and the brake cylinder 206 must be through the metering orifice 214. The limited flow through the metering orifice 214 will cause the gradual relief of fluid pressure in the brake cylinder 206 and thus provide modulated brake application and gradual arrest of the load.

During controlled lowering, fluid flow from the cavity 150 to the outlet 152 will be through less than all of the grooves 160, 162 and 164. This will generate a fluid pressure in the brake cylinder 206 which will be less than that required to completely release the brake 14. However, fluid pressure in the cylinder 206 will be of a magnitude that will cause slippage and limited rotation of the brake 14. Since the brake piston 202 will move only a slight distance to the right, a relatively small volume of fluid will be contained in the brake cylinder 206.

When the brake valve 122 is returned to the neutral position, fluid flow from the accumulator chamber 198 and the piston cylinder 206 will once again be limited to the left end of the piston 182 by action of the check valve 196.

Since during controlled lowering the pressure and volume of fluid contained in brake cylinder 206 is low, the volume of fluid acting on the piston surfaces 208 and 210 will not fully compress springs 188 and 190. Therefore, the springs 188 and 190 will not be compressed a distance sufficient to create the backpressure required to cause as indicated slippage of the brake 14. Brake application will be immediate.

It will thus be seen that the addition of the accumulator 174 to a draw works control system will provide the dual advantages of modulated braking during high-speed lowering and unmodulated rapid brake application during controlled lowering.

The system also includes means whereby the accumulator 62 may be discharged when the pump 20 or engine is inoperative. The fluid from the accumulator 62 is discharged through orifice 224 to either drain 130 to sump 22, or port 128 back through pump 20 to sump 22, depending upon the position of spool 122 and 140.

Other aspects, objects and advantages of this invention may be obtained from a study of the drawings, the disclosure and the appended claims.

We claim:

1. In combination with a control (28) for a hydraulically operated draw works or the like having a hydraulically disengaged brake (14) a transmission (10, 12), a brake control valve (114, 122) including an inlet (156) and an outlet (152), the outlet (152) connected to said brake, and a source of fluid (20) under pressure connected to said inlet (156), the improvement comprising:

means (172) for providing modulated application of said brake (14) after said brake (14) has been fully released, and to provide unmodulated brake application of said brake (14) after said brake (14) has been partially released.

2. The improved hydraulic draw works control (28) of claim 1 wherein said modulating means comprises an accumulator (174) having means to selectively (a) slowly relieve fluid backpressure to said brake (14) when presented with a large volume of fluid from said brake (14) and (b) rapidly relieve fluid backpressure to said brake (14) when presented with a relatively small volume of fluid from said brake (14).

3. The improved hydraulic draw works control (28) of claim 2 wherein said accumulator (174) includes a body (178) having a bore (180), a piston (182) slidable within said bore having a hollow body and passageways connecting the outer and inner surface of said piston (182), and spring means (188, 190) biasing said piston (182) towards a pedetermined position within said bore (180).

4. The improved hydraulic draw works control (28) of claim 3 wherein said accumulator (174) further includes a check valve (196) located between said control valve outlet (152) and said brake (14) to permit fluid flow to said brake (14) and to prevent fluid flow from said brake (14).

5. The improved hydraulic draw works control (28) of claim 3 wherein said accumulator (174) further includes a metering orifice (214) located between said control valve outlet (152) and said brake (14) to limit the rate of fluid flow from said brake (14) to said control valve (152).

6. In combination with a control (28) for a hydraulically operated draw works or the like having a hydraulically disengaged brake (14), a transmission (10, 12), and a brake control valve (114, 122), the improvement comprising:

an accumulator (174) including a body (178) having a bore (180), an inlet (176) connected to said control valve (114, 122) and an outlet (200) connected to said brake (14), a piston (182) slidable within said bore (180) and having a hollow interior (184), passageways (186) connecting the hollow interior (184) of said piston (182) to said inlet (176), and spring means (188, 190) biasing said piston (182) towards a predetermined position within said bore (180).

7. The improved hydraulic draw works control (28) of claim 6 further including a check valve connected between the hollow interior (184) of said piston (182) and said outlet (200) to permit unrestricted fluid flow to said brake (14) and to prevent unrestricted fluid flow from said brake (14).

8. The improved hydraulic draw works control (28) of claim 6 further including a metering orifice (214) located between said outlet (200) and said piston interior (184), to limit the rate of fluid flow between said outlet (200) and said inlet (176).

9. In combination with a control (28) for a hydraulically operated draw works or the like having a hydraulically disengaged brake (14), a transmission (10, 12), and a brake control valve (114, 122), the improvement comprising an accumulator (174) including:

a body (178) having a bore (180);

an inlet (176) in said body (178) connected to said control valve (114, 122);

an outlet (200) in said body (178) connected to said brake (14);

a hollow piston (182) slidable within said bore (180);

passageways (186) extending from the hollow interior of said piston (182) to the outer surface of said piston (182);

springs (188, 190) biasing said piston (180) to a predetermined position within said bore (180);

a check valve (196) located between said bore (180) and said outlet (200) to permit unrestricted fluid flow from said bore (180) to said outlet (200) and to prevent fluid flow from said outlet (200) to said bore (180); and a metering orifice (214) located in said piston (182) and extending from the hollow interior (184) of said piston (182) to the outer surface of said piston (182) to permit a continuous but limited rate of fluid flow between said outlet (200) and said inlet (176).

* * * * *